United States Patent
Ninomiya et al.

(10) Patent No.: US 12,525,034 B2
(45) Date of Patent: Jan. 13, 2026

(54) IMAGE PROCESSING DEVICE

(71) Applicant: Hitachi Astemo, Ltd., Hitachinaka (JP)

(72) Inventors: Takeru Ninomiya, Tokyo (JP);
Masayuki Takemura, Hitachinaka (JP)

(73) Assignee: Hitachi Astemo, Ltd., Hitachinaka (JP)

( * ) Notice: Subject to any disclaimer, the term of this patent is extended or adjusted under 35 U.S.C. 154(b) by 0 days.

(21) Appl. No.: 18/702,760

(22) PCT Filed: Oct. 4, 2022

(86) PCT No.: PCT/JP2022/037097
§ 371 (c)(1),
(2) Date: Apr. 18, 2024

(87) PCT Pub. No.: WO2023/068034
PCT Pub. Date: Apr. 27, 2023

(65) Prior Publication Data
US 2024/0412537 A1    Dec. 12, 2024

(30) Foreign Application Priority Data

Oct. 20, 2021   (JP) ................................ 2021-171656

(51) Int. Cl.
*G06T 7/00* (2017.01)
*G06T 5/80* (2024.01)
(Continued)

(52) U.S. Cl.
CPC .............. *G06V 20/588* (2022.01); *G06T 5/80* (2024.01); *G06T 7/13* (2017.01); *G06V 10/25* (2022.01)

(58) Field of Classification Search
CPC ........ G06V 20/588; G06V 10/25; G06T 5/80; G06T 7/13; G06T 2207/30252;
(Continued)

(56) References Cited

U.S. PATENT DOCUMENTS

2008/0240573 A1* 10/2008 Nakamura ........... G06V 20/588
                                                          382/190
2012/0320048 A1    12/2012 Yamashita et al.
(Continued)

FOREIGN PATENT DOCUMENTS

EP    3 896 387 A1    10/2021
JP    2016-006406 A    1/2016
(Continued)

OTHER PUBLICATIONS

International Search Report issued in PCT Application No. PCT/JP2022/037097 dated Dec. 6, 2022, with English Translation.

*Primary Examiner* — Howard D Brown, Jr.
(74) *Attorney, Agent, or Firm* — Foley & Lardner LLP

(57) ABSTRACT

Provided is an image processing device that, by performing highly accurate correction of a parallax error caused by a vertical offset between left and right cameras, makes it possible to accurately distinguish between a control object such as an object dropped on a road surface and road surface paint, and accurately detect a control object having a low step. The image processing device includes a specific region extraction unit that extracts a specific region on a road surface from a plurality of images captured by each of a plurality of in-vehicle cameras; a road surface parameter estimation unit that estimates a road surface structure represented by a road surface parameter, from a road surface portion other than the specific region, the road surface portion being a road surface in the image; a specific region parallax estimation unit that obtains, from the road surface structure, an ideal parallax to be obtained in the specific region; a parallax image generation unit that obtains a parallax from the plurality of images; and a vertical offset calculation unit that obtains a vertical offset amount of the plurality of images by using an actual parallax of the specific (Continued)

region, the ideal parallax of the specific region, and arrangement information in the image of the specific region.

9 Claims, 5 Drawing Sheets

(51) Int. Cl.
    *G06T 7/13*     (2017.01)
    *G06V 10/25*     (2022.01)
    *G06V 20/56*     (2022.01)

(58) Field of Classification Search
    CPC .......... G06T 2207/30261; G06T 7/593; G01C 11/04; G08G 1/16

See application file for complete search history.

(56) References Cited

U.S. PATENT DOCUMENTS

| | | | |
|---|---|---|---|
| 2013/0128001 A1* | 5/2013 | You | G06V 20/58 |
| | | | 348/47 |
| 2014/0104393 A1* | 4/2014 | Oho | H04N 13/246 |
| | | | 348/46 |
| 2015/0161455 A1* | 6/2015 | Osanai | G06V 20/582 |
| | | | 382/104 |
| 2016/0353083 A1 | 12/2016 | Aoki et al. | |
| 2019/0340446 A1* | 11/2019 | Li | G06V 10/267 |
| 2023/0215163 A1* | 7/2023 | Mao | G06V 10/30 |
| | | | 382/203 |

FOREIGN PATENT DOCUMENTS

| | | |
|---|---|---|
| JP | 2020-095646 A | 6/2020 |
| JP | 2021-025868 A | 2/2021 |
| WO | WO-2011/108283 A1 | 9/2011 |
| WO | WO-2016/203989 A1 | 12/2016 |

\* cited by examiner (a) NO VERTICAL OFFSET (b) WITH VERTICAL OFFSET (a) CAPTURED IMAGE (b) PARALLAX IMAGE
(DISPLAYED DENSER AS THE DISTANCE
FROM THE SENSOR BECOMES SHORTER)

(c) v-disparity MAP $Y = aZ + b$

IMAGE PROCESSING DEVICE

TECHNICAL FIELD

The present invention relates to an image processing device and an image processing method that recognize an environment in front of an own vehicle on the basis of a pair of own vehicle front images captured by an in-vehicle camera.

BACKGROUND ART

Automobiles of recent years have been equipped with systems that, on the basis of captured images captured in front of the own vehicle, recognize moving bodies such as a preceding vehicle or pedestrians, obstacles such as guardrails or objects dropped on the road surface, and road surface paint such as white lines, issue a warning to the driver when there is a possibility of contact with a moving body or an obstacle, perform automatic braking and automatic steering to avoid contact, and perform automatic steering to travel along the white line. As an image processing device used in this type of system, the image processing device of Patent Literature 1, which uses a stereo camera, is known.

The problem column of the Abstract of Patent Literature 1 includes the language "To detect a three-dimensional object accurately from a stereo image even when there is a vertical offset in the stereo image.", and claim 2 of the same document includes the language "detects a feature where both a vertical edge and a horizontal edge exist in the first region, detects a corresponding point corresponding to the feature point in the second region, and detects a vertical offset between the feature point in the first region and the corresponding point in the second region as a vertical offset between the first region and the second region". That is, the image processing device of Patent Literature 1 detects a corresponding point in the second image corresponding to a feature point in the first image of the stereo image, detects the vertical offset between the first image and the second image from the vertical offset between the feature point and the corresponding point, and calculates parallax in consideration of the vertical offset, thereby accurately detecting a three-dimensional object.

CITATION LIST

Patent Literature

PTL 1: JP 2020-095646 A

SUMMARY OF INVENTION

Technical Problem

Nevertheless, in the vertical offset detection method of Patent Literature 1, it is necessary to specify a corresponding point in a second image corresponding to a feature point in a first image. Therefore, in an environment in which there are few features in the stereo images and it is difficult to detect the feature point and the corresponding point (for example, in a case where only a uniform road surface is imaged), or in an environment in which there are many candidate corresponding points in the second image corresponding to the feature point in the first image and it is difficult to specify the true corresponding point (for example, in a case where a conduction band (a so-called zebra zone), which is a type of road surface paint, is imaged), it is difficult to detect the vertical offset between the stereo images, and it may be difficult to accurately distinguish road surface paint or a shadow from an obstacle having a low step (an object dropped on the road surface, the dead body of an animal, etc.), and thus an object dropped on the road surface may be misinterpreted as being road surface paint or a shadow, or the road surface paint or the shadow may be misinterpreted as being an obstacle.

Therefore, an object of the present invention is to provide an image processing device capable of accurately distinguishing between a control object such as an object dropped on a road surface and road surface paint or the like and accurately detecting a control object with a low level difference by performing high-accuracy correction of a parallax error caused by a vertical offset between left and right cameras.

Solution to Problem

In order to solve the above problem, an image processing device of the present invention includes:
a specific region extraction unit that extracts a specific region on a road surface from a plurality of images captured by each of a plurality of in-vehicle cameras; a road surface parameter estimation unit that estimates a road surface structure represented by a road surface parameter, from a road surface portion other than the specific region, the road surface portion being a road surface in the image; a specific region parallax estimation unit that obtains, from the road surface structure, an ideal parallax to be obtained in the specific region; a parallax image generation unit that obtains a parallax from the plurality of images; and a vertical offset calculation unit that obtains a vertical offset amount of the plurality of images by using an actual parallax of the specific region, the ideal parallax of the specific region, and arrangement information in the image of the specific region.

Advantageous Effects of Invention

With the image processing device of the present invention, by performing highly accurate correction of a parallax error caused by the vertical offset between left and right cameras, it is possible to accurately distinguish between a control object such as an object dropped on a road surface and road surface paint, and accurately detect a control object having a low step.

DESCRIPTION OF EMBODIMENTS

Hereinafter, an embodiment of an image processing device and an image processing method of the present invention that recognize an environment in front of an own vehicle on the basis of a pair of own vehicle front images captured by an in-vehicle camera will be described with reference to the drawings.

Description of Overall Configuration

Figure 1:
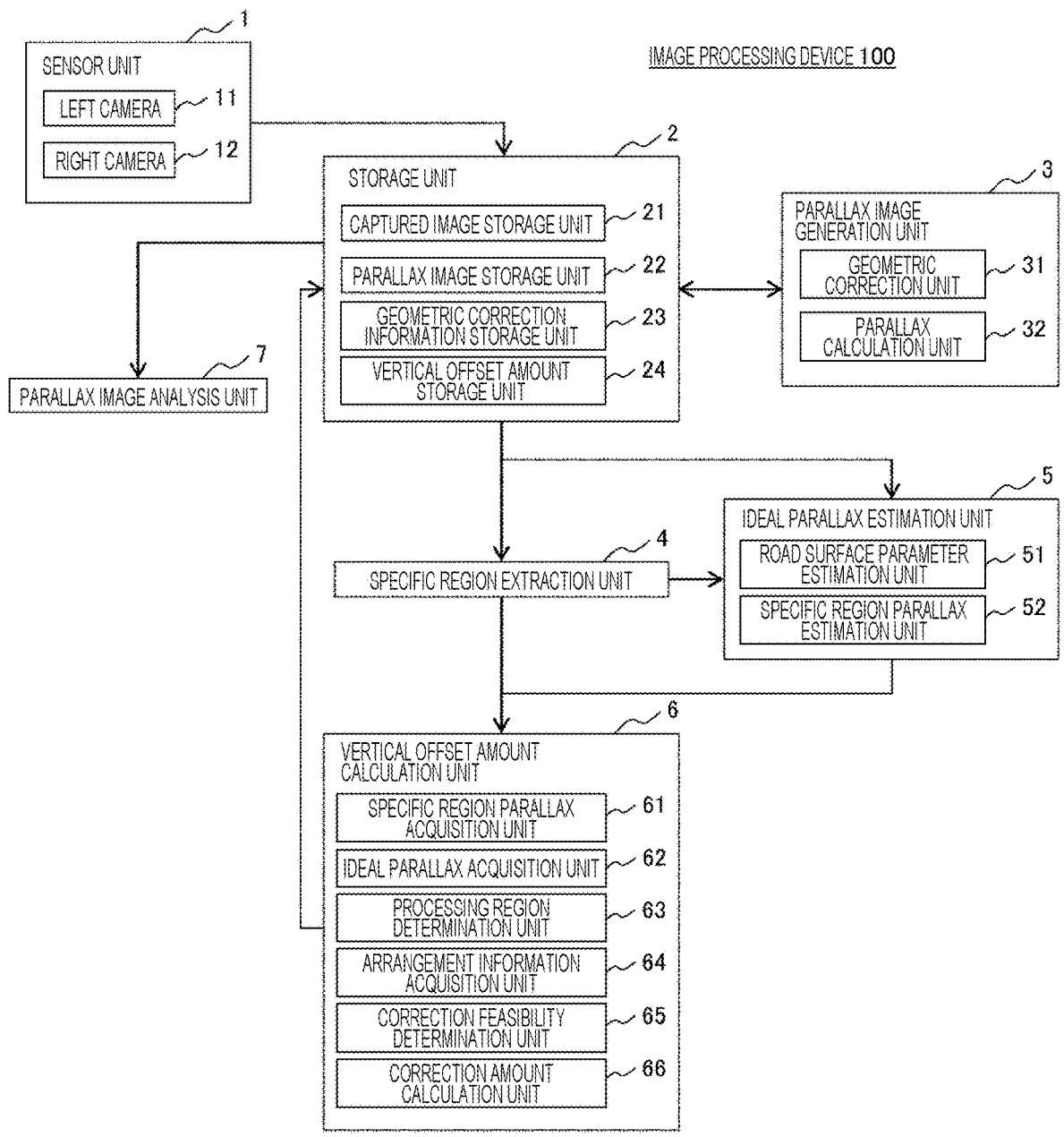
FIG. 1 shows an image processing device.

FIG. 1 shows an overall configuration diagram of an image processing device 100 according to the present embodiment. The image processing device 100 according to the present embodiment is an in-vehicle device used to recognize an environment in front of an own vehicle and, as illustrated in FIG. 1, includes a sensor unit 1, a storage unit 2, a parallax image generation unit 3, a specific region extraction unit 4, an ideal parallax estimation unit 5, a vertical offset amount calculation unit 6, and a parallax image analysis unit 7. The results of the analysis by the parallax image analysis unit 7 are inputted to an electronic control unit (ECU) (not illustrated) and used to implement a self-driving system and a driving assistance system.

Note that, in the configuration of FIG. 1, the configuration other than the sensor unit 1 is specifically a computer including an arithmetic device such as a CPU, a storage device such as a semiconductor memory, and hardware such as a communication device. The arithmetic device then executes a predetermined program to implement the functions of the parallax image generation unit 3, the specific region extraction unit 4, and the like. Hereinafter, details of each unit will be described while omitting, as appropriate, such well-known features in the field of computers.

<Sensor Unit 1>

The sensor unit 1 is an in-vehicle camera installed in a predetermined direction around the vehicle, for example, toward the front of the vehicle, and includes two imaging devices, namely, a left camera 11 and a right camera 12. Note that, hereinafter, the present embodiment will be described assuming that the sensor unit 1 is a stereo camera, but a camera system including two monocular cameras having a predetermined interval therebetween may also be used as the sensor unit 1.

<Storage Unit 2>

A storage unit 2 is a storage device such as a semiconductor memory, and includes a captured image storage unit 21, a parallax image storage unit 22, a geometric correction information storage unit 23, and a vertical offset amount storage unit 24.

The captured image storage unit 21 stores captured images of the left camera 11 and captured images of the right camera 12.

The parallax image storage unit 22 stores the parallax image $P_D$ generated by the parallax image generation unit 3.

The geometric correction information storage unit 23 stores geometric correction information for the captured images of the left camera 11 and the right camera 12. The geometric correction information is information for correcting distortion or a positional offset of the captured image caused by lens distortion of, or an optical axis offset between, the left camera 11 and the right camera 12, and is information set in advance at the time of factory shipment or the like according to the optical characteristics or the like of the sensor unit 1. Note that the captured images of the left and right cameras geometrically corrected using the geometric correction information are hereinafter referred to as a left image $P_L$ and a right image PR.

The vertical offset amount storage unit 24 stores a vertical offset amount dj between the left camera 11 and the right camera 12 caused by aging or the like.

Figure 2:
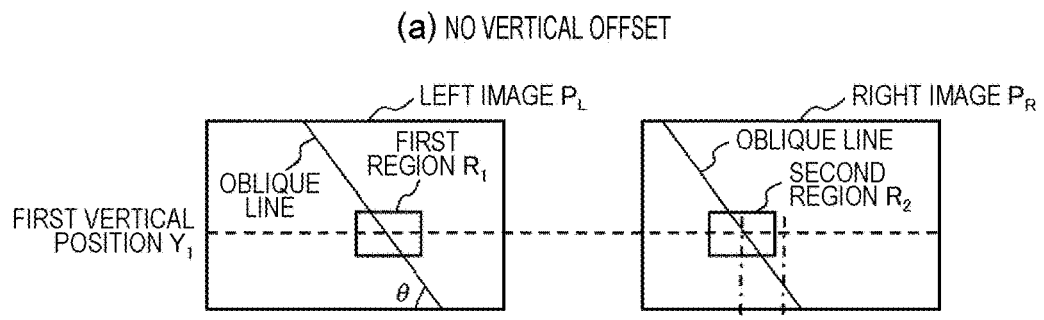
FIG. 2 illustrates a vertical offset.
Figure 2:
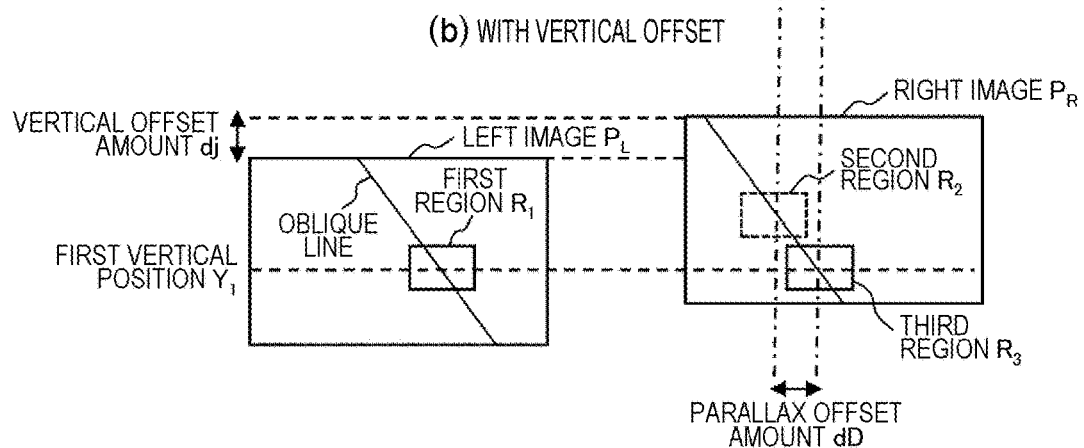

Here, the influence of a vertical offset in a general stereo camera will be described with reference to FIG. 2. In a general stereo camera, parallax is calculated by specifying a common imaging region of the left image $P_L$ and the right image $P_R$, and three-dimensional information in front of the camera is acquired.

In the stereo camera illustrated in FIG. 2(a), in which a vertical offset between the left and right images does not occur, because a predetermined region (for example, a first region $R_1$ that includes part of an oblique line such as a white line or a shadow) in a left image $P_L$ and a second region $R_2$ in a right image $P_R$, which is a common imaging region of the first region $R_1$ are in the same image vertical position (a first vertical position $Y_1$), the second region $R_2$, which is the common imaging region of the first region $R_1$ can be easily specified by searching the first vertical position $Y_1$ in the right image $P_R$ in the horizontal direction, and thus accurate three-dimensional information (in the present example, three-dimensional information indicating that the oblique line is not a three-dimensional object) can be acquired from an accurate parallax.

On the other hand, in the case of the stereo camera illustrated in FIG. 2(b) in which a vertical offset between the left and right images occurs, an oblique line having the same inclination as that of the first region $R_1$ is also imaged in the third region $R_3$ in the right image $P_R$, which is not the common imaging region of the first region $R_1$, and thus the first region $R_1$ and the third region $R_3$ may be erroneously matched. In this case, the parallax offset amount dD[pix] occurs between the second region $R_2$, which is the original common imaging region and the third region $R_3$, which is not the original common imaging region.

Here, assuming that the inclination of oblique lines in the left and right images is θ[rad] and the vertical offset amount of the left and right images is dj[pix], the parallax offset amount dD is calculated by Equation 1. In addition, the height offset amount dY of the target object when the parallax offset amount dD occurs is calculated by Equation 2 with respect to the height Y of the camera, where the parallax value is D.

[Equation 1]

$$dD = \frac{dj}{\tan\theta} \quad \text{(Equation 1)}$$

[Equation 2]

$$dY = Y\frac{dD}{D+dD} \quad \text{(Equation 2)}$$

That is, a stereo camera in which a vertical offset has occurred is confronted by the problem that because the height offset amount dY of Equation 2 that does not originally exist is calculated, oblique lines such as white lines and shadows on the road surface are erroneously detected as three-dimensional objects. Because the vertical offset of the stereo camera inevitably occurs due to aging of the imaging device, a temperature change, or the like, it is necessary to constantly estimate and correct the vertical offset amount during operation of the stereo camera.

Therefore, as a prerequisite for processing to correct a vertical offset, the vertical offset amount storage unit 24 according to the present embodiment stores a vertical offset amount which is estimated by the vertical offset amount calculation unit 6. The vertical offset amount stored in the vertical offset amount storage unit 24 is used when the parallax is calculated by the parallax image generation unit 3, and thus a vertical offset between imaging devices can be corrected and the parallax can be accurately estimated. As a result, it is possible to prevent an oblique line such as a white line or a shadow on the road surface from being erroneously detected as a three-dimensional object. Note that the vertical offset amount storage unit 24 may store only the vertical offset amount outputted to the current frame by the vertical offset amount calculation unit 6, or may store a plurality of vertical offset amounts outputted in the past by the vertical offset amount calculation unit 6 as chronological information.

<Parallax Image Generation Unit 3>

The parallax image generation unit 3 includes a geometric correction unit 31 and a parallax calculation unit 32, and generates a parallax image $P_D$ by using, as inputs, the left and right images stored in the captured image storage unit 21, the geometric correction information stored in the geometric correction information storage unit 23, and the vertical offset amount dj stored in the vertical offset amount storage unit 24, and outputs the parallax image $P_D$ to the parallax image storage unit 22 of the storage unit 2.

The geometric correction unit 31 geometrically corrects the captured image by using, as inputs, the left and right images stored in the captured image storage unit 21 and the geometric correction information stored in the geometric correction information storage unit 23. As a result, distortion and positional offset of a captured image caused by lens distortion and optical axis offset are corrected. In addition, in a case where the vertical offset amount dj is stored in the vertical offset amount storage unit 24, the geometric correction unit 31 also uses the value for geometric correction.

Figure 3:
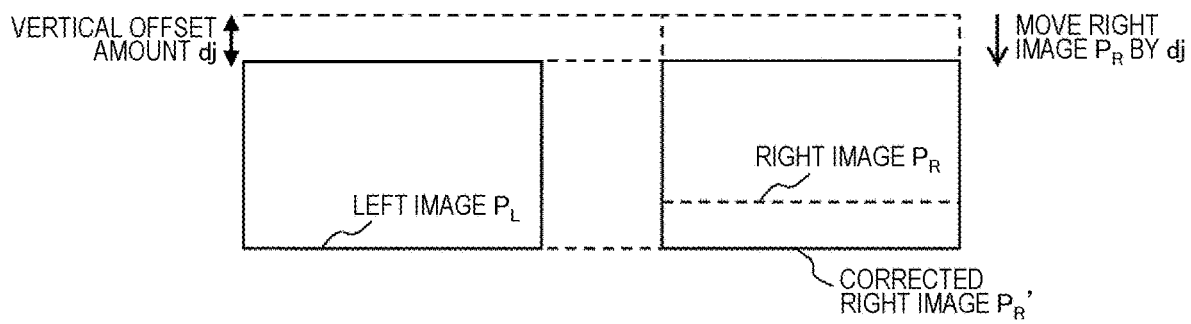
FIG. 3 shows a vertical offset correction method.

Here, a vertical offset correction method using the vertical offset amount dj will be described with reference to FIG. 3. As illustrated, in a case where the vertical offset amount between the left image $P_L$ and the right image $P_R$ after the geometric correction is dj, the geometric correction unit 31 refers to the vertical offset amount dj[pix] stored in the vertical offset amount storage unit 24, and moves the right image $P_R$ in the vertical direction by dj[pix] to generate a corrected right image $P_R'$ in which the vertical offset is corrected. At this time, in a case where a plurality of past vertical offset amounts are stored in the vertical offset amount storage unit 24, one most likely value may be calculated from the plurality of past vertical offset amounts and set to dj[pix]. A method for determining one value from a plurality of vertical offset amounts is determined by using a statistical technique to remove outliers and obtaining an average. In addition, the determination may be made using any other technique. Note that, in FIG. 3, the corrected right image $P_R'$ is generated by moving the right image $P_R$ in the vertical direction, but the corrected left image $P_L'$ may be generated by moving the left image $P_L$ in the vertical direction.

The parallax calculation unit 32 generates a parallax image $P_D$ from the left and right images corrected by the geometric correction unit 31. Specifically, a template image having a predetermined size is extracted from one captured image, and a difference (parallax) between imaging positions of the same object is estimated by means of template matching in the other captured image. A parallax image $P_D$ in which the parallax is stored in each pixel is generated by calculating the parallax for the entire region of the captured image.

<Specific Region Extraction Unit 4>

The specific region extraction unit 4 extracts a specific region from the captured image stored in the captured image storage unit 21. In the present embodiment, the specific region is an oblique line region that exists on the road surface (see FIG. 2), and includes various linear regions such as a white line, road surface paint, a shadow, and a dirt region on the road surface. For example, the white line region is extracted by detecting a white edge included in the captured image. The present invention is not limited to or by this technique, rather, various linear regions such as white lines, road surface paint, shadows, and a dirt region on the road surface may be estimated using a technique for estimating types at a pixel level such as semantic segmentation.

In a case where the white line region is extracted, a white line region map in which 0 and 1 are used to distinguish whether each pixel is a white line is outputted to the ideal parallax estimation unit 5 and the vertical offset amount calculation unit 6. Furthermore, in a case where a technique for estimating the type at the pixel level such as semantic segmentation is used, a type map in which type information (white line, road surface paint, shadow, road surface dirt, and the like) is stored in each pixel may be outputted. In addition, in a case where the region is estimated by modeling (straight line, polygonal line, or the like), the model parameters may be outputted. Note that, in order to enhance the specific region extraction accuracy, AI technology such as deep learning may be used.

<Ideal Parallax Estimation Unit 5>

The ideal parallax estimation unit 5 estimates the ideal parallax of each portion in the captured image, and includes a road surface parameter estimation unit 51 and a specific region parallax estimation unit 52.

The road surface parameter estimation unit 51 receives the parallax image $P_D$ stored in the parallax image storage unit 22 and the output of the specific region extraction unit 4, and estimates the road surface structure in front of the own vehicle. Hereinafter, a road surface parameter estimation method will be described with reference to FIG. 4.

Figure 4:
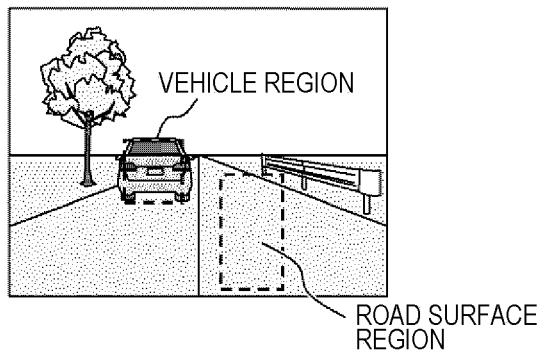
FIG. 4 is an explanatory diagram of a road surface parameter estimation method.
Figure 4:
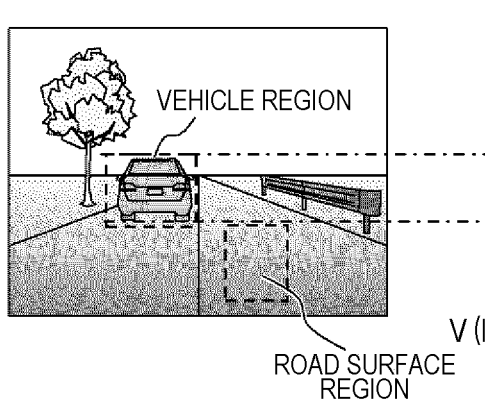
Figure 4:
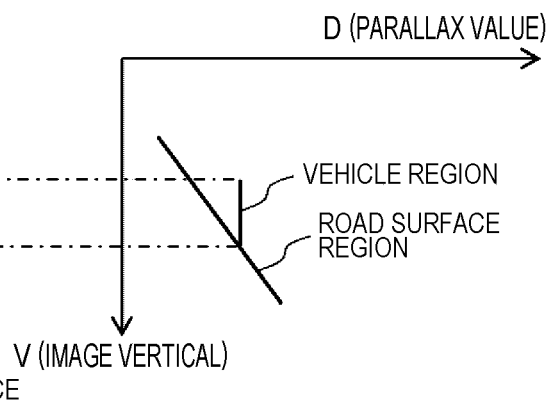

First, the parallax image $P_D$ illustrated in FIG. 4(*b*) is generated from the captured image (although not illustrated, actually, a pair of left and right captured images) illustrated in FIG. 4(*a*). In the road surface region of FIG. 4(*b*), when the image vertical position changes, the parallax value stored in each pixel also changes smoothly. Meanwhile, it can be seen that three-dimensional objects such as vehicles exist at the same distance from the own vehicle, and parallax values of the same value are collected.

When a v-disparity map of the horizontal axis D (parallax value) and the vertical axis V (image vertical position) as illustrated in FIG. 4(*c*) is created from the parallax image $P_D$ in FIG. 4(*b*), a three-dimensional object such as a vehicle is rendered as a vertical straight line, and a road surface region is rendered as a straight line extending down and to the right. Therefore, the road surface parameter estimation unit 51 is capable of estimating the road surface structure by obtaining a down-rightward straight line parameter.

When the disparity of the specific region estimated by the specific region parallax estimation unit 52 is also plotted at the time of creating the v-disparity map, the straight line parameter is on occasion not accurately estimated because many disparity errors are included. Therefore, adding noise removal processing such that the parallax of the specific region estimated by the specific region parallax estimation unit 52 is not plotted on the v-disparity map may also be considered. Further, the present invention is not limited to this arrangement, rather, any road surface structure estimation technique can also be used.

The road surface parameter estimation unit 51 may also output the reliability of the parameter estimation result. Because the vertical offset amount calculation unit 6 calculates the vertical offset amount on the basis of the road surface parameter estimated by the road surface parameter estimation unit 51, determining, on the basis of the reliability of the parameter estimation result, whether the current travel environment is suitable for calculating the vertical offset amount may also be considered. The reliability of the parameter estimation result can be calculated by the amount of disparity used to create the v-disparity map. In an environment where road surface parallax is difficult due to light quantity phenomena caused by a road surface pattern or a building shadow, or at night, and so forth, there is a reduction in the information plotted on the v-disparity map. Due to the drop in accuracy if the amount of information used to calculate the straight line parameter is small, using the number of pieces of disparity information plotted on the v-disparity map as the reliability of the parameter estimation result may also be considered. In addition, the degree of fitting when the straight line parameter is fitted to the v-disparity map may be used as the reliability. Further, the road surface parameter estimation results are referenced in chronological order, and setting a high reliability in a case where a flat road surface is continuously observed may also be considered. Furthermore, in a case where weather and time information can be acquired, the reliability may be lowered in conditions (at night, rainy weather, and so forth) where it is difficult to calculate the road surface parallax.

The specific region parallax estimation unit 52 estimates the ideal parallax of the specific region (hatched line) from the road surface parameter outputted by the road surface parameter estimation unit 51. An ideal parallax estimation method will be described with reference to FIGS. 5A and 5B.

Figure 5A:
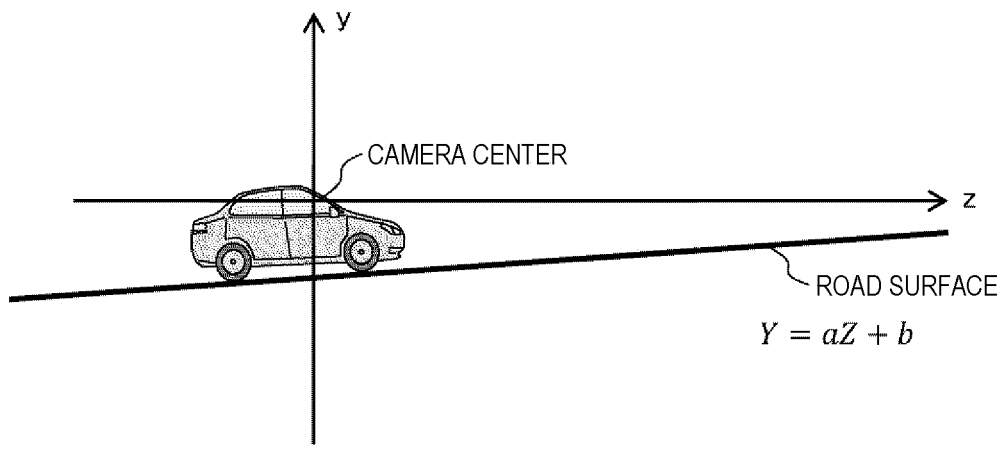
FIG. 5A is an explanatory view of an ideal parallax estimation method.

FIG. 5A illustrates an orthogonal coordinate system in which the installation position of the stereo camera in the own vehicle during a climb is the point of origin, the depth direction is the horizontal axis z, and the vertical direction is the vertical axis y. In this orthogonal coordinate system, the road surface is represented by a straight line represented by Equation 3. Here, a in Equation 3 is the inclination of the road surface with the camera center taken as the point of origin, and b is the road surface intercept with the camera center taken as the point of origin.

[Equation 3]
$$Y = aZ + b \qquad \text{(Equation 3)}$$

Figure 5B:
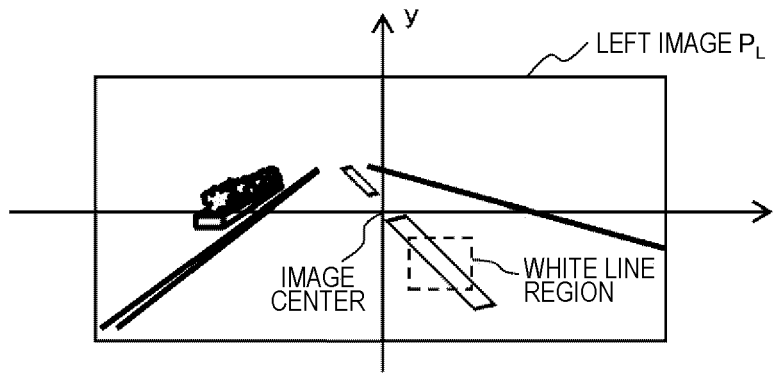
FIG. 5B is an example of a captured image in the environment of FIG. 5A.

FIG. 5B is an example of the left image $P_L$ captured by the stereo camera of FIG. 5A (although not illustrated, the right image $P_R$ is also captured), and the horizontal axis x indicates the image horizontal direction and the vertical axis y indicates the image longitudinal direction, taking the image center as the point of origin. At this time, an ideal parallax D of the white line region (broken-line frame in FIG. 5B) at y in the image coordinates is calculated by Equation 4. Here, B in Equation 4 is the base length of the stereo camera, f is the focal length, and c is the cell size.

[Equation 4]
$$D = \frac{B}{b}\left(y - \frac{f}{c}a\right) \qquad \text{(Equation 4)}$$

The specific region parallax estimation unit 52 calculates Equation 4 for all the specific regions estimated by the specific region extraction unit 4 to generate an ideal parallax map storing the ideal parallax of each specific region, and outputs the same to the vertical offset amount calculation unit 6. In addition, from the viewpoint of reducing processing costs, the ideal parallax may be calculated and outputted only for a portion of the plurality of specific regions.

<Vertical Offset Amount Calculation Unit 6>

The vertical offset amount calculation unit 6 calculates the vertical offset amount dj of the left and right images captured by the stereo camera on the basis of the specific region information extracted by the specific region extraction unit 4 and the ideal parallax information estimated by the ideal parallax estimation unit 5, and includes a specific region parallax acquisition unit 61, an ideal parallax acquisition unit 62, a processing region determination unit 63, an arrangement information acquisition unit 64, a correction feasibility determination unit 65, and a correction amount calculation unit 66.

The specific region parallax acquisition unit 61 receives, as an input, the specific region information (the above-described white line region map, type map, model parameter, and the like) outputted by the specific region extraction unit 4, and acquires the parallax information of the corresponding region from the parallax image storage unit 22.

The ideal parallax acquisition unit 62 acquires the ideal parallax map estimated by the ideal parallax estimation unit 5.

The processing region determination unit 63 determines a processing region in which the correction amount calculation unit 66 calculates the vertical offset. In a case where the specific region is large, the number of images for calculating the vertical offset increases, and thus, from the viewpoint of reducing the processing cost, limiting the specific region for calculating the vertical offset may also be considered. In a case where the specific region parallax acquisition unit 61 acquires a type map in which type information (white line, road surface paint, shadow, road surface dirt, and the like) is stored in each pixel, the processing region is limited by selecting the type to be used. For example, because the white line and the road surface paint displayed in conspicuous white on the road surface are easily extracted, setting only the specific region to which the label of the white line and the road surface paint is applied as the processing region may be considered. Furthermore, considering that the accuracy of parallax calculation decreases as the distance from the imaging device increases, the processing region may be set by selecting a predetermined number of data in order of proximity from the imaging device. In addition, the processing region may be set according to other arbitrary criteria.

The arrangement information acquisition unit 64 uses, as an input, the specific region information (the above-described white line region map, type map, model parameter, and the like) outputted by the specific region extraction unit 4, and calculates specific region arrangement information. The specific region arrangement information is the angle of an oblique line on a captured image, and is, for example, the oblique line inclination θ in FIG. 2.

The correction feasibility determination unit 65 determines whether the current travel environment is suitable for calculating the vertical offset amount dj, and causes the correction amount calculation unit 66 to execute the correction amount calculation only in a case where the current travel environment is determined to be suitable. For example, in a case where the road surface parameter estimation unit 51 outputs the reliability of the road surface parameter estimation result, it is determined that calculation is possible in a case where the value exceeds a predetermined threshold value.

In a case where the correction feasibility determination unit 65 determines that the current travel environment is suitable for calculating the vertical offset amount, the correction amount calculation unit 66 calculates the vertical offset amount dj on the basis of the information from the specific region parallax acquisition unit 61, the ideal parallax acquisition unit 62, and the arrangement information acquisition unit 64. Equation 5 is used to calculate the vertical offset amount dj. Here, $D_{Road}$ in Equation 5 is the ideal parallax estimated by the ideal parallax estimation unit 5 on the basis of the road surface parameter; $D_{Line}$ is the parallax in the specific region (white line) acquired by the specific region parallax acquisition unit 61; and θ is the inclination of the specific region on the image.

[Equation 5]

$$dj = (D_{Road} - D_{Line}) \times \tan\theta \qquad \text{(Equation 5)}$$

In a case where there are a plurality of specific regions, the vertical offset amount dj is calculated for all pixels or for some pixels, and the most likely estimation result is determined from the plurality of estimation results. The determination method is determined by using a statistical technique to remove outliers and then obtaining an average. In addition, the determination may be made using an arbitrary calculation method.

<Parallax Image Analysis Unit 7>

The parallax image analysis unit 7 analyzes the parallax images $P_D$ stored in the parallax image storage unit 22 and thus outputs information to be used in the self-driving/driving assistance system (for example, results of detection of a preceding vehicle, pedestrians, road edges, and the like). Because the parallax image $P_D$ to be analyzed by the parallax image analysis unit 7 is generated on the basis of the right and left images corrected using the vertical offset amount dj calculated by the vertical offset amount calculation unit 6, the parallax image analysis unit 7 is capable of accurately distinguishing between paint or a shadow on the road surface and an obstacle with a low step, and thus is capable of accurately detecting free space where the vehicle is able to travel, and an object dropped on the road surface having a low step.

(Process Flow of Parallax Image Generation)

Figure 6:
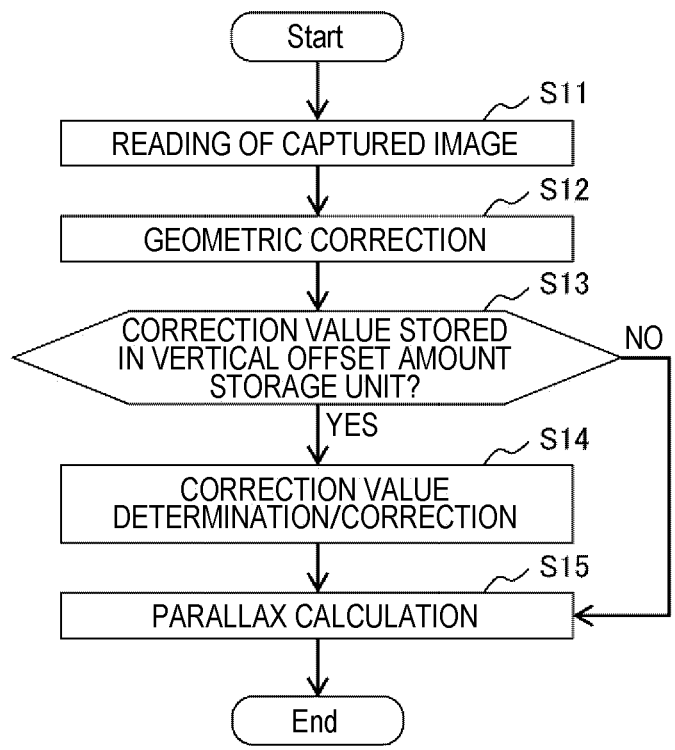
FIG. 6 is a process flow for disparity image generation.

Next, a process flow of the parallax image generation unit 3 will be described with reference to FIG. 6.

First, in step S11, the geometric correction unit 31 reads the left and right images before the geometric correction from the captured image storage unit 21.

In step S12, the geometric correction unit 31 reads the geometric correction information stored in the geometric correction information storage unit 23, and geometrically corrects the left and right images acquired in step S11. Through the processing in step S12, the left image $P_L$ and the right image $P_R$, obtained by geometrically correcting the lens distortion and the optical axis offset, are generated.

In step S13, the geometric correction unit 31 confirms whether the vertical offset amount dj is stored in the vertical offset amount storage unit 24. In a case where the vertical offset amount is stored in the vertical offset amount storage unit 24, the processing advances to step S14, and in a case where the vertical offset amount is not stored therein, the processing advances to step S15.

In step S14, the geometric correction unit 31 refers to the vertical offset amount stored in the vertical offset amount storage unit 24 and determines a correction value for the left and right images. In a case where only the latest vertical offset amount dj is stored in the vertical offset amount storage unit 24, the value (dj) is set as the correction value. In a case where a plurality of vertical offset amounts is stored in the vertical offset amount storage unit 24, outliers are removed using a statistical technique by referring to vertical offset amounts in a predetermined range from the current time, and an average value is set as the correction value. In addition, the present invention is not limited to or by this method, and the correction value may be set, by means of an arbitrary technique, from a plurality of vertical offset amounts. The captured image is corrected on the basis of the correction value thus determined. As illustrated in FIG. 3, the correction method generates a corrected right image $P_R'$ obtained by moving the right image $P_R$ in the vertical direction by the correction value (vertical offset amount dj[pix]).

In step S15, if step S14 is not performed, the parallax image $P_D$ is generated from the left image $P_L$ and the right image $P_R$, and if step S14 is performed, the parallax image $P_D$ is generated from the left image $P_L$ and the corrected right image $P_R'$. In either case, the parallax is calculated by searching the common imaging region through template matching of the left and right images. In addition, the present invention is not limited to or by this technique, rather, any parallax calculation processing may be used.

(Process Flow of Vertical Offset Amount Calculation Unit)

Figure 7:
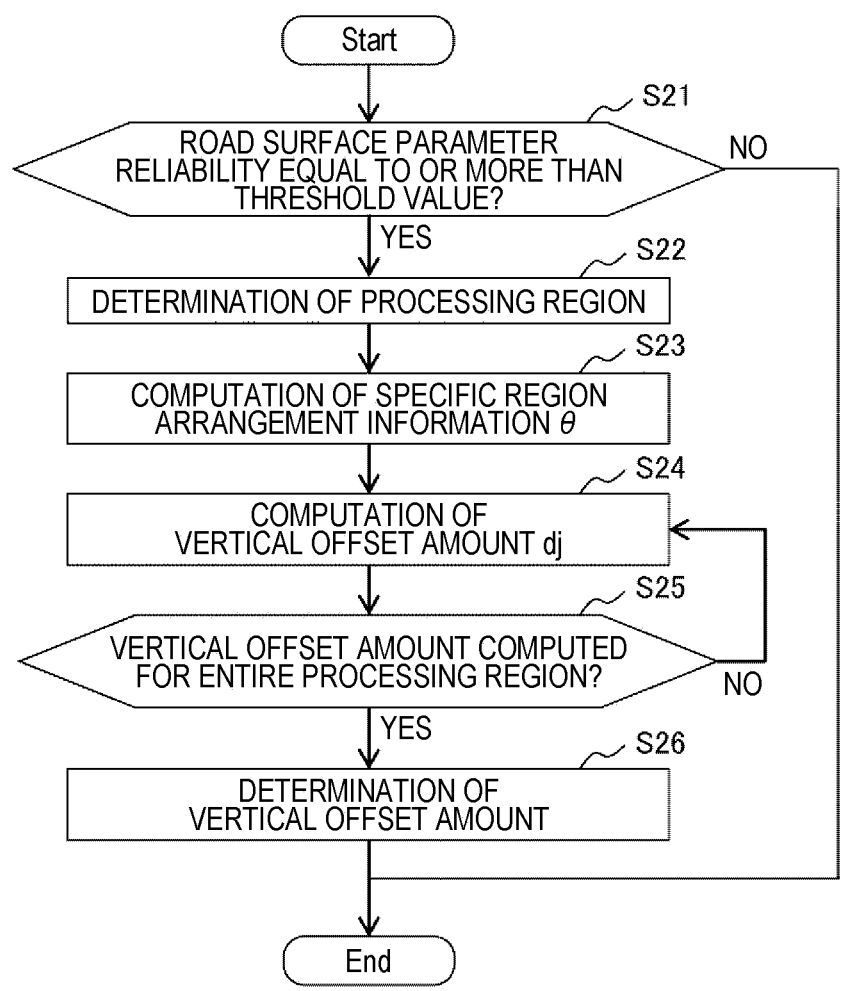
FIG. 7 is a process flow for a vertical offset amount calculation unit.

Next, a process flow of the vertical offset amount calculation unit 6 will be described with reference to FIG. 7.

First, in step S21, the correction feasibility determination unit 65 refers to the road surface parameter reliability, and ends the processing without calculating the vertical offset amount in a case where the reliability is equal to or less than a predetermined threshold value. On the other hand, in a case where the reliability is equal to or more than the predetermined threshold value, step S22 is executed.

In step S22, the processing region determination unit 63 determines a processing region for which the vertical offset amount is calculated. At this time, the processing region is determined according to the type label and the distance from the sensor unit 1. In addition, the processing region may be determined by setting an arbitrary reference.

In step S23, the arrangement information acquisition unit 64 calculates arrangement information (for example, the inclination θ of the oblique line) for the region determined as the processing region in step S22.

In step S24, the correction amount calculation unit 66 calculates the vertical offset amount dj from the arrangement information (oblique line inclination θ), the parallax of the specific region, and the value of the ideal parallax.

In a case where it is determined in step S25 that the vertical offset amount dj has been calculated in all the processing regions, step S26 is performed. In a case where the entire processing region has not been processed, step S24 is repeatedly executed.

In step S26, the vertical offset amount is finally determined. In a case where a plurality of vertical offset amounts dj is calculated, the vertical offset amount dj is determined by removing outliers by a statistical technique and obtaining an average. Furthermore, the vertical offset amount dj may be determined using any other technique.

Advantageous Effects of Present Embodiment

With the image processing device according to the present embodiment described above, by performing highly accurate correction of a parallax error caused by the vertical offset of the left and right cameras, it is possible to accurately distinguish between the control object such as the object dropped on the road surface and the road surface paint and the like, and it is possible to accurately detect a control object even having a low step.

REFERENCE SIGNS LIST 100 image processing device
1 sensor unit
11 left camera
12 right camera
2 storage unit
21 captured image storage unit
22 parallax image storage unit
23 geometric correction information storage unit
24 vertical offset amount storage unit
3 parallax image generation unit
31 geometric correction unit
32 parallax calculation unit
4 specific region extraction unit
5 ideal parallax estimation unit
51 road surface parameter estimation unit
52 specific region parallax estimation unit
6 vertical offset amount calculation unit
61 specific region parallax acquisition unit
62 ideal parallax acquisition unit
63 processing region determination unit
64 arrangement information acquisition unit
65 correction feasibility determination unit
66 correction amount calculation unit
7 parallax image analysis unit

The invention claimed is:

1. An image processing device, comprising:
a specific region extraction unit that extracts a specific region on a road surface from a plurality of images captured by each of a plurality of in-vehicle cameras;
a road surface parameter estimation unit that estimates a road surface structure represented by a road surface parameter, from a road surface portion other than the specific region, the road surface portion being a road surface in the image;
a specific region parallax estimation unit that obtains, from the road surface structure, an ideal parallax to be obtained in the specific region;
a parallax image generation unit that obtains a parallax from the plurality of images; and
a vertical offset calculation unit that obtains a vertical offset amount of the plurality of images by using an actual parallax of the specific region, the ideal parallax of the specific region, and arrangement information in the image of the specific region,
wherein the specific region is a white line region on a road surface, and
wherein the vertical offset calculation unit calculates the vertical offset amount from a difference between a parallax of the white line region and a parallax of the road surface portion and an inclination angle of a white line in the image.

2. An image processing device, comprising:
a specific region extraction unit that extracts a specific region on a road surface from a plurality of images captured by each of a plurality of in-vehicle cameras;
a road surface parameter estimation unit that estimates a road surface structure represented by a road surface parameter, from a road surface portion other than the specific region, the road surface portion being a road surface in the image;
a specific region parallax estimation unit that obtains, from the road surface structure, an ideal parallax to be obtained in the specific region;
a parallax image generation unit that obtains a parallax from the plurality of images; and
a vertical offset calculation unit that obtains a vertical offset amount of the plurality of images by using an actual parallax of the specific region, the ideal parallax of the specific region, and arrangement information in the image of the specific region,
wherein the parallax image generation unit corrects optical distortion of an image captured by the in-vehicle camera, and
wherein a vertical offset of a plurality of images captured by the in-vehicle camera is corrected on the basis of the vertical offset amount.

3. The image processing device according to claim 2, wherein the parallax image generation unit determines the feasibility of executing the correction and the correction amount, from chronological information on the vertical offset amount estimated in the past.

4. The image processing device according to claim 2, wherein the specific region extraction unit extracts an oblique line region on the road surface.

5. The image processing device according to claim 2, wherein the specific region extraction unit extracts at least one linear region among a white line, road surface paint, and a shadow on the road surface.

6. The image processing device according to claim 3, wherein the road surface parameter estimation unit estimates the road surface parameter from an image captured by the in-vehicle camera, and
wherein the specific region parallax estimation unit estimates the ideal parallax of the specific region on the basis of the road surface parameter.

7. The image processing device according to claim 5, wherein the arrangement information is an inclination angle of the specific region in the image.

8. The image processing device according to claim 7, wherein the vertical offset amount calculation unit determines whether to calculate the vertical offset amount on the basis of the reliability of the road surface parameter.

9. An image processing method, comprising the steps of:
extracting a specific region on a road surface from a plurality of images captured by each of a plurality of in-vehicle cameras;
estimating a road surface structure represented by a road surface parameter, from a road surface portion other than the specific region, the road surface portion being a road surface in the image;
obtaining, from the road surface structure, an ideal parallax to be obtained in the specific region;
obtaining a parallax from the plurality of images; and
obtaining a vertical offset amount of the plurality of images by using an actual parallax of the specific region, the ideal parallax of the specific region, and arrangement information in the image of the specific region, wherein the specific region is a white line region on a road surface, and wherein obtaining the vertical offset amount of the plurality of images further comprises calculating the vertical offset amount from a difference between a parallax of the white line region and a parallax of the road surface portion and an inclination angle of a white line in the image.

\* \* \* \* \*